US009275200B2

(12) United States Patent
Nakamura et al.

(10) Patent No.: US 9,275,200 B2
(45) Date of Patent: Mar. 1, 2016

(54) INFORMATION PROCESSING DEVICE, LICENSE ASSIGNMENT METHOD, AND COMPUTER-READABLE, NON-TRANSITORY MEDIUM

(71) Applicant: PFU LIMITED, Kahoku-shi, Ishikawa (JP)

(72) Inventors: Tomoharu Nakamura, Kahoku (JP); Masaki Matsuda, Kahoku (JP); Koji Hirohashi, Kahoku (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 14/476,565

(22) Filed: Sep. 3, 2014

(65) Prior Publication Data

US 2015/0332025 A1 Nov. 19, 2015

(30) Foreign Application Priority Data

May 14, 2014 (JP) ................................ 2014-100668

(51) Int. Cl.
*G06F 21/00* (2013.01)
*G06F 21/10* (2013.01)

(52) U.S. Cl.
CPC ...... *G06F 21/105* (2013.01); *G06F 2221/0775* (2013.01)

(58) Field of Classification Search
CPC ........ G06F 21/10; G06F 21/105; G06Q 50/22
See application file for complete search history.

(56) References Cited

U.S. PATENT DOCUMENTS

| 5,579,222 A * | 11/1996 | Bains ..................... G06F 11/34 705/16 |
| 7,734,550 B1 * | 6/2010 | Bennett ................ G06F 21/105 705/51 |
| 2001/0013024 A1 | 8/2001 | Takahashi et al. |
| 2010/0299425 A1 * | 11/2010 | Yamada ................ G06Q 10/06 709/223 |

FOREIGN PATENT DOCUMENTS

| JP | 2001-222424 | 8/2001 |
| JP | 2002-279165 | 9/2002 |

(Continued)

OTHER PUBLICATIONS

Japanese Office action mailed Oct. 6, 2015 for corresponding JP Application No. 2014100668 including English translation, 7pp.

*Primary Examiner* — Amir Mehrmanesh
(74) *Attorney, Agent, or Firm* — Lewis Roca Rothgerber Christie LLP

(57) ABSTRACT

An information processing apparatus includes a storage for storing a plurality types of software licenses in association with a number of possessed licenses, a product type of a software product, and a device specification condition, a receiver for receiving information of a software product operating in a management target device and information of a device specification of the management target device, a determining module for determining a software license to be assigned to the management target device based on the number of possessed licenses, a number of the product types, or the device specification condition, when there is a plurality of software licenses, in which the software product is included in the product type and the device specification meets the device specification condition, among the plurality types of software licenses, and an assigning module for assigning a software license determined by the determining module to the management target device.

20 Claims, 14 Drawing Sheets

(56) References Cited

FOREIGN PATENT DOCUMENTS

| JP | 2004-126642 | 4/2004 |
| JP | 2006-92317 | 4/2006 |
| JP | 2012-123653 | 6/2012 |
| JP | 2012-208752 | 10/2012 |

* cited by examiner

FIG. 3A  LICENSE RULE TABLE

| SOFTWARE LICENSE NAME | LICENSE RULE ID | PRODUCT ID | DEVICE SPECIFICATION CONDITION | | VIRTUAL MACHINE CONDITION | PRICE | ... |
| --- | --- | --- | --- | --- | --- | --- | --- |
| | | | UPPER LIMIT NUMBER OF CPUS | ... | | | |
| LICENSE 1 | L001 | P001, P002 | UNLIMITED | ... | N/A | 12,000 | ... |
| LICENSE 2 | L002 | P001 | UNLIMITED | ... | N/A | 10,000 | ... |
| LICENSE 3 | L003 | P003 | UNLIMITED | ... | N/A | 10,000 | ... |
| LICENSE 4 | L004 | P003 | 2 | ... | N/A | 10,000 | ... |
| LICENSE 5 | L005 | P004 | UNLIMITED | ... | N/A | 10,000 | ... |
| LICENSE 6 | L006 | P005, P006 | UNLIMITED | ... | PHYSICAL | 12,000 | ... |
| LICENSE 7 | L007 | P005, P006 | 4 | ... | PHYSICAL | 12,000 | ... |
| LICENSE 8 | L008 | P005 | UNLIMITED | ... | VIRTUAL | 6,000 | ... |
| LICENSE 9 | L009 | P005, P006 | UNLIMITED | ... | VIRTUAL | 8,000 | ... |
| ... | ... | ... | ... | ... | ... | ... | ... |

FIG. 3B  LICENSE POSSESSION NUMBER MANAGEMENT TABLE

| SOFTWARE LICENSE NAME | LICENSE RULE ID | NUMBER OF POSSESSED LICENSES | ... |
| --- | --- | --- | --- |
| LICENSE 1 | L001 | 2 | ... |
| LICENSE 2 | L002 | 2 | ... |
| LICENSE 3 | L003 | 4 | ... |
| LICENSE 4 | L004 | 4 | ... |
| LICENSE 5 | L005 | 0 | ... |
| LICENSE 6 | L006 | 6 | ... |
| LICENSE 7 | L007 | 6 | ... |
| LICENSE 8 | L008 | 4 | ... |
| LICENSE 9 | L009 | 4 | ... |
| ... | ... | ... | ... |

DEVICE CONFIGURATION MANAGEMENT TABLE

| DEVICE NAME | DEVICE ID | DEVICE SPECIFICATION INFORMATION | | VIRTUAL MACHINE SPECIFICATION INFORMATION | | PRODUCT ID (PRODUCT NAME) | ... |
|---|---|---|---|---|---|---|---|
| | | NUMBER OF CPUS | ... | VIRTUAL MACHINE NAME | VIRTUAL MACHINE ID | | |
| DEVICE 1 | D001 | 2 | ... | — | — | P001 (PRODUCT 1)<br>P003 (PRODUCT 3) | ... |
| DEVICE 2 | D002 | 4 | ... | — | — | P002 (PRODUCT 2)<br>P003 (PRODUCT 3)<br>P004 (PRODUCT 4) | ... |
| DEVICE 3 | D003 | 4 | ... | VIRTUAL 1 | V001 | P005 (PRODUCT 5) | ... |
| | | | | VIRTUAL 2 | V002 | P006 (PRODUCT 6) | ... |
| ... | ... | ... | ... | ... | ... | ... | ... |

FIG. 8

ASSIGNMENT MANAGEMENT TABLE

| ASSIGNMENT ID | DEVICE ID | VIRTUAL MACHINE ID | PRODUCT ID | ... |
|---|---|---|---|---|
| A001 | D001 | — | P001 | ... |
| A002 | D001 | — | P003 | ... |
| A003 | D002 | — | P002 | ... |
| A004 | D002 | — | P003 | ... |
| A005 | D002 | — | P004 | ... |
| A006 | D003 | V001 | P005 | ... |
| A007 | D003 | V002 | P006 | ... |
| ... | ... | ... | ... | ... |

FIG. 9

LICENSE NUMBER MANAGEMENT TABLE

| LICENSE RULE ID | PRODUCT ID | NUMBER OF POSSESSED LICENSES | NUMBER OF REMAINING LICENSES | ... |
|---|---|---|---|---|
| L001 | P001, P002 | 2 | 2 | ... |
| L002 | P001 | 2 | 2 | ... |
| L003 | P003 | 4 | 4 | ... |
| L004 | P003 | 4 | 4 | ... |
| L005 | P004 | 0 | 0 | ... |
| L006 | P005, P006 | 6 | 6 | ... |
| L007 | P005, P006 | 6 | 6 | ... |
| L008 | P005 | 4 | 4 | ... |
| L009 | P005, P006 | 4 | 4 | ... |
| ... | ... | ... | ... | ... |

FIG. 10
ASSIGNMENT CANDIDATE MANAGEMENT TABLE

| LICENSE RULE ID | NUMBER OF USAGE LICENSES | VIRTUAL MACHINE FLAG | APPLICABLE PRODUCT ID | DEVICE SPECIFICATION CONDITION | | VIRTUAL MACHINE CONDITION | PRICE | ... |
|---|---|---|---|---|---|---|---|---|
| | | | | UPPER LIMIT NUMBER OF CPUS | ... | | | |
| ... | ... | ... | ... | ... | ... | ... | ... | ... |
| ... | ... | ... | ... | ... | ... | ... | ... | ... |

FIG. 11
ASSIGNMENT RESULT TABLE

| ASSIGNMENT ID | DEVICE ID | PRODUCT ID | LICENSE RULE ID | ... |
|---|---|---|---|---|
| A001 | D001 | P001 | L002 | ... |
| A002 | D001 | P003 | L004 | ... |
| A003 | D002 | P002 | L001 | ... |
| A004 | D002 | P003 | L003 | ... |
| A005 | D002 | P004 | L005 | ... |
| A006 | D003 | P005 | L008 | ... |
| A007 | D003 | P006 | L009 | ... |
| ... | ... | ... | ... | ... |

FIG. 13A
ASSIGNMENT CANDIDATE MANAGEMENT TABLE

| LICENSE RULE ID | NUMBER OF USAGE LICENSES | VIRTUAL MACHINE FLAG | APPLICABLE PRODUCT ID | DEVICE SPECIFICATION CONDITION | | VIRTUAL MACHINE CONDITION | PRICE | ... |
| --- | --- | --- | --- | --- | --- | --- | --- | --- |
| | | | | UPPER LIMIT NUMBER OF CPUS | ... | | | |
| L001 | 2 | OFF | P001, P002 | | | | | |
| L002 | 2 | OFF | P001 | | | | | |

FIG. 13B
ASSIGNMENT CANDIDATE MANAGEMENT TABLE

| LICENSE RULE ID | NUMBER OF USAGE LICENSES | VIRTUAL MACHINE FLAG | APPLICABLE PRODUCT ID | DEVICE SPECIFICATION CONDITION | | VIRTUAL MACHINE CONDITION | PRICE | ... |
| --- | --- | --- | --- | --- | --- | --- | --- | --- |
| | | | | UPPER LIMIT NUMBER OF CPUS | ... | | | |
| L003 | 2 | OFF | P003 | UNLIMITED | | | | |
| L004 | 2 | OFF | P003 | 2 | | | | |

FIG. 13C
ASSIGNMENT CANDIDATE MANAGEMENT TABLE

| LICENSE RULE ID | NUMBER OF USAGE LICENSES | VIRTUAL MACHINE FLAG | APPLICABLE PRODUCT ID | DEVICE SPECIFICATION CONDITION | | VIRTUAL MACHINE CONDITION | PRICE | ... |
| --- | --- | --- | --- | --- | --- | --- | --- | --- |
| | | | | UPPER LIMIT NUMBER OF CPUS | ... | | | |
| L001 | 4 | OFF | P001, P002 | | | | | |

FIG. 13D

ASSIGNMENT CANDIDATE MANAGEMENT TABLE

| LICENSE RULE ID | NUMBER OF USAGE LICENSES | VIRTUAL MACHINE FLAG | APPLICABLE PRODUCT ID | DEVICE SPECIFICATION CONDITION | | VIRTUAL MACHINE CONDITION | PRICE | ... |
|---|---|---|---|---|---|---|---|---|
| | | | | UPPER LIMIT NUMBER OF CPUS | ... | | | |
| L003 | 4 | OFF | P003 | | | | | |

FIG. 13E

ASSIGNMENT CANDIDATE MANAGEMENT TABLE

| LICENSE RULE ID | NUMBER OF USAGE LICENSES | VIRTUAL MACHINE FLAG | APPLICABLE PRODUCT ID | DEVICE SPECIFICATION CONDITION | | VIRTUAL MACHINE CONDITION | PRICE | ... |
|---|---|---|---|---|---|---|---|---|
| | | | | UPPER LIMIT NUMBER OF CPUS | ... | | | |
| L005 | 4 | OFF | P004 | | | | | |

FIG. 15

ASSIGNMENT CANDIDATE MANAGEMENT TABLE

| LICENSE RULE ID | NUMBER OF USAGE LICENSES | VIRTUAL MACHINE FLAG | APPLICABLE PRODUCT ID | DEVICE SPECIFICATION CONDITION | | VIRTUAL MACHINE CONDITION | PRICE | ... |
|---|---|---|---|---|---|---|---|---|
| | | | | UPPER LIMIT NUMBER OF CPUS | ... | | | |
| L006 | 4 | ON | P005, P006 | UNLIMITED | ... | PHYSICAL | | |
| L007 | 4 | ON | P005, P006 | 4 | ... | PHYSICAL | | |
| L008 | 4 | ON | P005 | UNLIMITED | ... | VIRTUAL | | |
| L009 | 4 | ON | P005, P006 | UNLIMITED | ... | VIRTUAL | | |

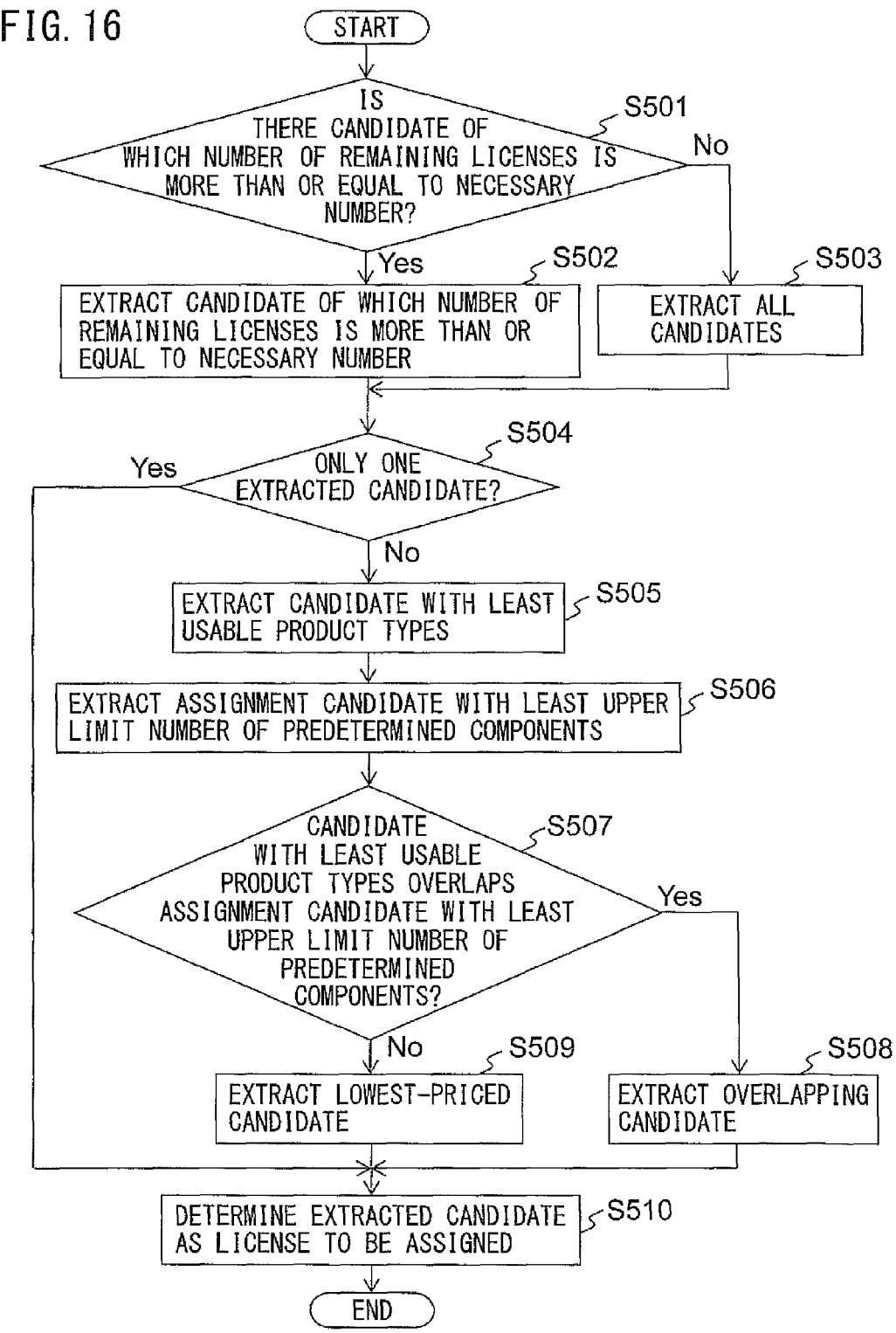

INFORMATION PROCESSING DEVICE, LICENSE ASSIGNMENT METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2014-100668, filed on May 14, 2014, the entire contents of which are incorporated herein by reference.

TECHNICAL FIELD

Embodiments discussed in the present specification relate to license assignment technology.

BACKGROUND

Generally, a software license defines a product usable by the license, a device specification condition relating to a specification of a management target device, such as a personal computer and a server device, in which the license can be assigned, and the like. Thus, even when a license is acquired for software that operates in a specific management target device, the license sometimes cannot be assigned to the management target device depending on a device specification condition or the like defined for the license.

A software license management device is disclosed that outputs a use state relating to overs and shorts of the number of software licenses or additional purchase information of the number of the software licenses. This software license management device automatically collects inventory information including software actually installed in computers in an organization. The software license management device calculates overs and shorts of the number of software licenses from a difference between the number of software licenses that the organization possesses and the number of software licenses that are actually used (see Japanese Laid-open Patent Publication No. 2001-222424).

Further, a software license management system is disclosed, that sorts software licenses into groups according to versions thereof and calculates the number of overs and shorts of the software licenses in each group. This software license management system manages software licenses including a downgrade right (see Japanese Laid-open Patent Publication No. 2006-92317).

Further, a license management device is disclosed, that manages software licenses for a server computer in which a virtual machine is established. This license management device determines whether software is used more than the number of obtained licenses when a licensing unit of the software is based on physical information of a server computer (see Japanese Laid-open Patent Publication No. 2012-208752).

SUMMARY

In a system including a great deal of management target devices, preferably, software licenses are efficiently assigned to respective management target devices.

Accordingly, it is an object of the present invention to provide an information processing device, a license assignment method that can efficiently assign software licenses to management target devices, and a computer-readable, non-transitory medium storing a computer program for causing a computer to implement such a license assignment method.

According to an aspect of the device, there is provided an information processing device. The information processing device includes a storage for storing a plurality types of software licenses in association with a number of possessed licenses, a product type of a software product that is usable by the software license, and a device specification condition in which the software license can be assigned, a receiver for receiving information of the software product operating in a management target device and information of a device specification of the management target device, a determining module for determining a software license to be assigned to the management target device based on the number of possessed licenses, a number of the product types, or the device specification condition, when there is a plurality of software licenses, in which a software product operating in the management target device is included in the product type and the device specification of the management target device meets the device specification condition, among the plurality types of software licenses, and an assigning module for assigning a software license determined by the determining module to the management target device.

According to an aspect of the method, there is provided a license assignment method for an information processing device which includes storing a plurality types of software licenses in the storage, in association with a number of possessed licenses, a product type of a software product that is usable by the software license, and a device specification condition in which the software license can be assigned, receiving information of a software product operating in a management target device and information of a device specification of the management target device, determining a software license to be assigned to the management target device based on the number of possessed licenses, a number of the product types, or the device specification condition, when there is a plurality of software licenses in which the software product operating in the management target device is included in the product types and the device specification of the management target device meets the device specification condition, among the plurality types of software licenses, and assigning, using a computer, the determined software license to the management target device.

According to an aspect of the computer-readable, non-transitory medium storing a computer program, the computer program causes a computer to execute a process, including storing a plurality types of software licenses in the storage, in association with a number of possessed licenses, a product type of a software product that is usable by the software license, and a device specification condition in which the software license can be assigned, receiving information of a software product operating in a management target device and information of a device specification of the management target device, determining a software license to be assigned to the management target device based on the number of possessed licenses, a number of the product types, or the device specification condition, when there is a plurality of software licenses in which the software product operating in the management target device is included in the product type and the device specification of the management target device meets the device specification condition, among the plurality types of software licenses, and assigning the determined software license to the management target device.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF THE DRAWINGS

FIG. 3A is a diagram depicting an example of data structure of a license rule table.

FIG. 3B is a diagram depicting an example of data structure of a license possession number management table.

FIG. 8 is a diagram depicting an example of data structure of an assignment management table.

FIG. 9 is a diagram depicting an example of data structure of a license number management table.

FIG. 10 is a diagram depicting an example of data structure of an assignment candidate management table.

FIG. 11 is a diagram depicting an example of data structure of an assignment result table.

FIG. 13A is a diagram depicting an example of the assignment candidate management table.

FIG. 13B is a diagram depicting an example of the assignment candidate management table.

FIG. 13C is a diagram depicting an example of the assignment candidate management table.

FIG. 13D is a diagram depicting an example of the assignment candidate management table.

FIG. 13E is a diagram depicting an example of the assignment candidate management table.

FIG. 15 is a diagram depicting an example of the assignment candidate management table.

FIG. 16 is a flowchart depicting another example of an operation of first assignment candidate determination processing.

DESCRIPTION OF EMBODIMENTS

Hereinafter, an information processing device, license assignment method, and computer program according to an embodiment, will be described with reference to the drawings. However, it should be noted that the technical scope of the invention is not limited to these embodiments, and extends to the inventions described in the claims and their equivalents.

Figure 1:
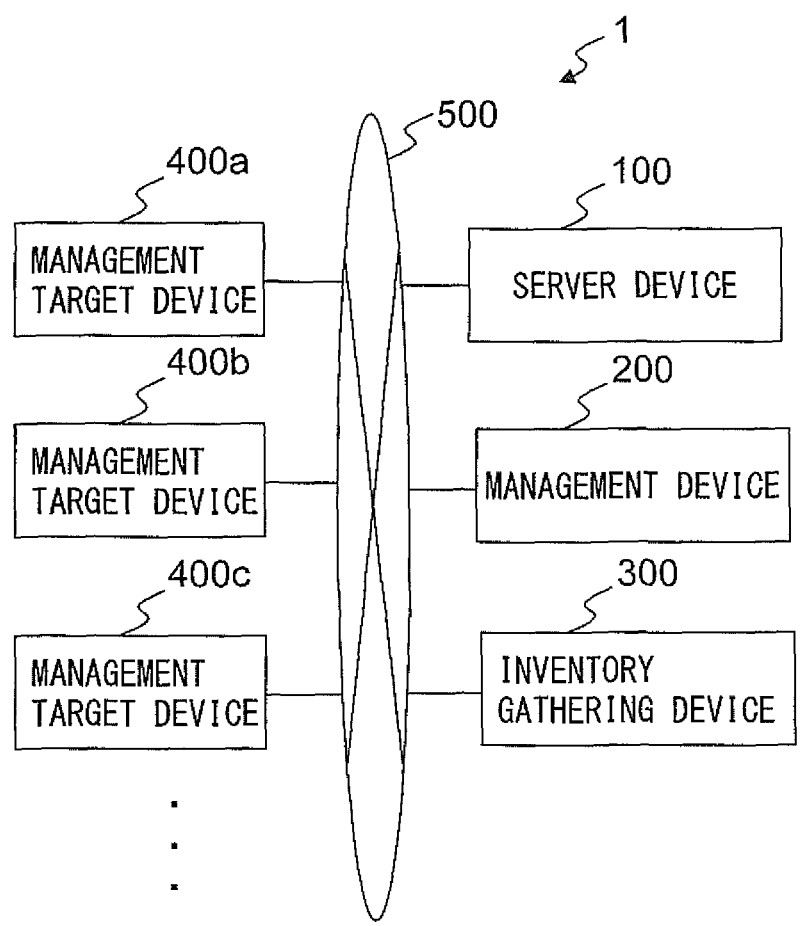
FIG. 1 is a schematic structure diagram depicting a license management system 1 according to an embodiment.

FIG. 1 is a schematic structure diagram depicting a license management system 1 according to an embodiment. The license management system 1 includes a server device 100, a management device 200, an inventory gathering device 300, and a plurality of management target devices 400a to 400c. The server device 100, the management device 200, the inventory gathering device 300, and the management target devices 400a to 400c are connected to one another, via a network 500, such as an intranet or the Internet, by a wired Local Area Network (LAN) such as Ethernet (registered trade mark). Hereinafter, the plurality of management target devices 400a to 400c may be collectively referred to as a management target device 400.

The server device 100 is an example of an information processing device, which assigns software licenses to software products operating in each management target device 400.

The management device 200 is a device, for example, a personal computer, that is operated by an administrator. According to an operation by the administrator, the management device 200 instructs the inventory gathering device 300 to acquire inventory information of each management target device 400, instructs the server device 100 to assign a software license to each management target device 400, and others. The inventory information includes information related to a software product that operates in each management target device 400 and information related to a device specification of each management target device 400.

The inventory gathering device 300 is a device, for example, a server, that acquires inventory information from each management target device 400.

The management target device 400 is a device, for example, a personal computer or a server, that is managed by the server device 100, and that a software license is assigned to for a software product operating therein.

Figure 2:
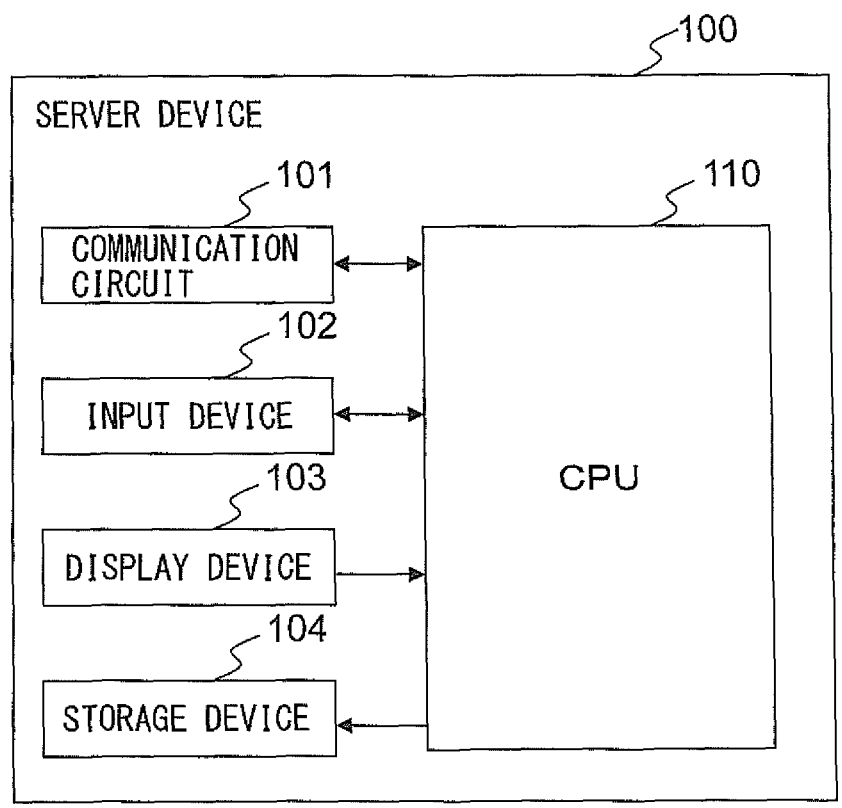
FIG. 2 is a hardware block diagram of a server device 100.

FIG. 2 is a hardware block diagram of the server device 100. As depicted in FIG. 2, the server device 100 includes a communication circuit 101, an input device 102, a display device 103, a storage device 104, and a Central Processing Unit (CPU) 110. Each unit of the server device 100 will be described below in detail.

The communication circuit 101 includes a wired communication interface circuit for transmitting and receiving signals through a wired communication network, such as a wired LAN, according to a protocol, such as Ethernet (registered trade mark). The communication circuit 101 transmits and receives various kinds of information by connecting with the server device 100, the management device 200, the inventory gathering device 300, and the management target device 400 via the network 500.

The input device 102 includes an input component, for example, a mouse and a keyboard, and an interface circuit that acquires a signal from the input component. The input device 102 outputs a signal to the CPU 110 according to a user operation.

The display device 103 includes a display configured with liquid crystal or the like and an interface circuit that outputs image data or various kinds of information to the display. The display device 103 is connected to the CPU 110 and displays information being output by the CPU 110 to the display. The input device 102 and the display device 103 may be configured in one unit by using a touch panel display.

The storage device 104 is an example of a storage. The storage device 104 includes a memory device, such as a Random Access Memory (RAM) and a Read Only Memory (ROM), a fixed disc device, such as a hard disk, a portable storage device, such as a flexible disc and an optical disc, or the like. Further, the storage device 104 stores a computer program, a database, a table, and the like that are used for various types of processing of the server device 100. The computer program may be installed on the storage device 104 from a computer-readable, non-transitory medium such as a compact disk read only memory (CD-ROM), a digital versatile disk read only memory (DVD-ROM), or the like by using a well-known setup program or the like.

Further, the storage device 104 stores a license rule table that indicates rules defined for each software license and a license possession number management table that manages the number of possessed licenses for each software license. Further, the storage device 104 stores a device configuration management table that manages device configuration of each management target device 400. The storage device 104 also stores an assignment management table, a license number management table, an assignment candidate management table, and an assignment result table that are used in assignment processing of licenses to each management target device 400. Details of each table will be described later herein.

The CPU 110 is connected to and controls the communication circuit 101, the input device 102, the display device 103, and the storage device 104. The CPU 110 performs transmission and reception control of data via the communication circuit 101, input control of the input device 102, display control of the display device 103, control of the storage device 104, and the like. Further, the CPU 110 assigns a software license to a software product that operates in each management target device 400.

FIG. 3A is a diagram depicting an example of data structure of the license rule table. The license rule table associates and stores a software license name, a license rule identification (ID), a product ID, a device specification condition, a virtual machine condition, a software license price, and the like for each of a plurality types of software licenses.

The license rule ID is identification information that is uniquely defined for each rule defined for the software license. The product ID is identification information that is uniquely defined for each product type of a software product to be usable by the software license. The device specification condition is a condition related to a device specification of the management target device in which the software license is assignable. For example, the upper limit number of predetermined components, such as the CPU and the communication circuit, included in the management target device is stored as the device specification condition. The predetermined component is not limited to a physically separate component, but may be a plurality of components that are integrally formed such as a CPU core.

The virtual machine condition is a condition used when a software product operates in a virtual machine on the management target device, and indicates whether the software license is assignable to a physical machine or a virtual machine. Note that a software license assignable to a physical machine can be assigned to all virtual machines that operate on the management target device, while a software license assignable to a virtual machine can be assigned to only one virtual machine.

FIG. 3B is a diagram depicting an example of data structure of the license possession number management table. The license possession number management table stores a software license name, a license rule ID, a number of possessed license, and the like for each of a plurality types of software licenses.

Figures 4, 5:
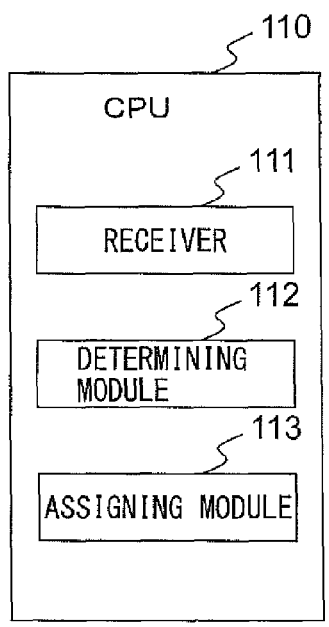
FIG. 4 is a diagram depicting an example of data structure of a device configuration management table.
FIG. 5 is a diagram depicting an example of schematic structure of a CPU 110.

FIG. 4 is a diagram depicting an example of data structure of the device configuration management table. The device configuration management table stores a device name, a device ID, device specification information, virtual machine specification information, a product ID, and the like for each management target device.

The device ID is identification information that is uniquely defined for each management target device. As the device specification information, for example, the number of predetermined components, such as the CPU and the communication circuit, included in a management target device, is stored. When a software product operates in a virtual machine on the management target device, a virtual machine name of the virtual machine in which the software product operates and a virtual machine ID that is identification information uniquely defined for the virtual machine are stored as the virtual machine specification information.

FIG. 5 is a diagram depicting an example of schematic structure of the CPU 110. As depicted in FIG. 5, the CPU 110 includes a receiver 111, a determining module 112, and an assigning module 113. Each module is a functional module that is implemented by software operating on a processor. Note that such modules may be respectively configured by an independent integrated circuit, microprocessor, firmware, or the like.

Figure 6:
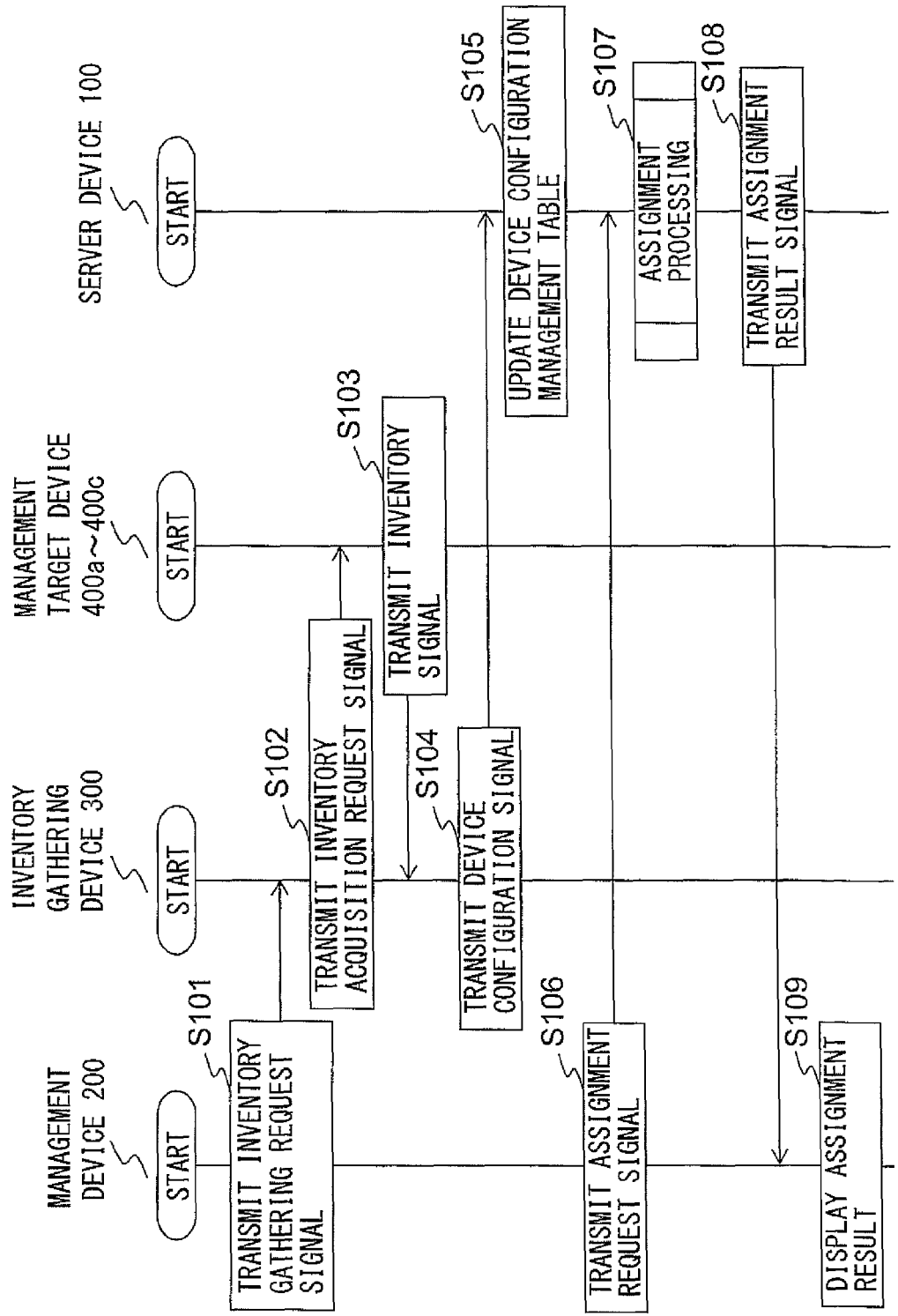
FIG. 6 is a sequence diagram depicting an example of a license assignment sequence.

FIG. 6 is a sequence diagram depicting an example of a license assignment sequence in the license management system 1. The following will describe an example of the license assignment sequence of the license management system 1 with reference to the sequence diagram depicted in FIG. 6. Each operation as will be described below is performed in the server device 100, primarily by the CPU 110 jointly with each element of the server device 100 according to a program stored in advance in the storage device 104. Similarly, each operation is performed, in the management device 200, the inventory gathering device 300, and the management target devices 400*a* to 400*c*, primarily by a CPU (not depicted) of each device jointly with each element of each device, according to a program stored in a storage device (not depicted) in each device.

According to an operation by an administrator, the management device 200 initially transmits an inventory gathering request signal that requests the inventory gathering device 300 to gather inventory information of each management target device 400, to the inventory gathering device 300 (step S101). Note that the management device 200 may transmit the inventory gathering request signal at a predetermined time interval.

Next, upon receiving the inventory gathering request signal from the management device 200, the inventory gathering device 300 transmits an inventory acquiring request signal that requests acquisition of inventory information to each management target device 400 (step S102). The inventory acquiring request signal includes a device ID of the management target device 400. The inventory gathering device 300 stores in advance the device IDs and addresses of the management target devices 400 of which inventory information is to be acquired, thus, transmits the inventory acquiring request signal to all the management target devices 400 of which device IDs and addresses are stored.

Next, upon receiving the inventory acquiring request signal from the inventory gathering device 300, the management target device 400 transmits an inventory signal to the inventory gathering device 300 (step S103). The inventory signal includes a device ID of the management target device 400 and inventory information pertaining to the management target device 400. The inventory information includes product IDs of all software products operating in the management target device 400, device specification information of the management target device 400, and virtual machine specification information of the management target device 400.

Next, upon receiving the inventory signal from each management target device 400, the inventory gathering device 300 stores the inventory information included in the received inventory signal in association with the device ID. When the inventory gathering device 300 already stores the inventory information corresponding to the device ID included in the received inventory signal, the inventory gathering device 300 updates the already stored inventory information to the inventory information included in the received inventory signal. Then, the inventory gathering device 300 transmits a device configuration signal to the server device 100 (step S104). The device configuration signal includes all the acquired inventory information of the management target devices 400 in association with the device IDs.

Next, upon receiving the device configuration signal from the inventory gathering device 300, the receiver 111 of the server device 100 updates the device configuration management table using device IDs and inventory information included in the received device configuration signal (step S105). The server device 100 updates, in the device configuration management table, respective information corresponding to each device ID included in the device configuration signal, using the inventory information pertaining to the device ID.

Next, the management device 200 transmits an assignment request signal that requests assignment of a software license to each management target device 400, to the server device 100 (step S106). The management device 200 transmits the assignment request signal in a predetermined time after transmitting the inventory gathering request signal in step S101. Note that the management device 200 may transmit the assignment request signal asynchronously with transmission timing of the inventory gathering request signal. In such a case, the management device 200 transmits the assignment request signal, for example, according to new operation by an administrator.

Next, when the receiver 111 of the server device 100 receives the assignment request signal from the management device 200 via the communication circuit 101, the determining module 112 and the assigning module 113 perform assignment processing that assigns a software license to each management target device 400 (step S107). Details of the assignment processing will be described later.

Next, the assigning module 113 of the server device 100 transmits an assignment result signal that includes an assignment result of the assignment processing, to the management device 200 via the communication circuit 101 (step S108).

Next, upon receiving the assignment result signal from the server device 100, the management device 200 notifies an administrator by displaying the assignment result included in the assignment result signal (step S109).

Figure 7:
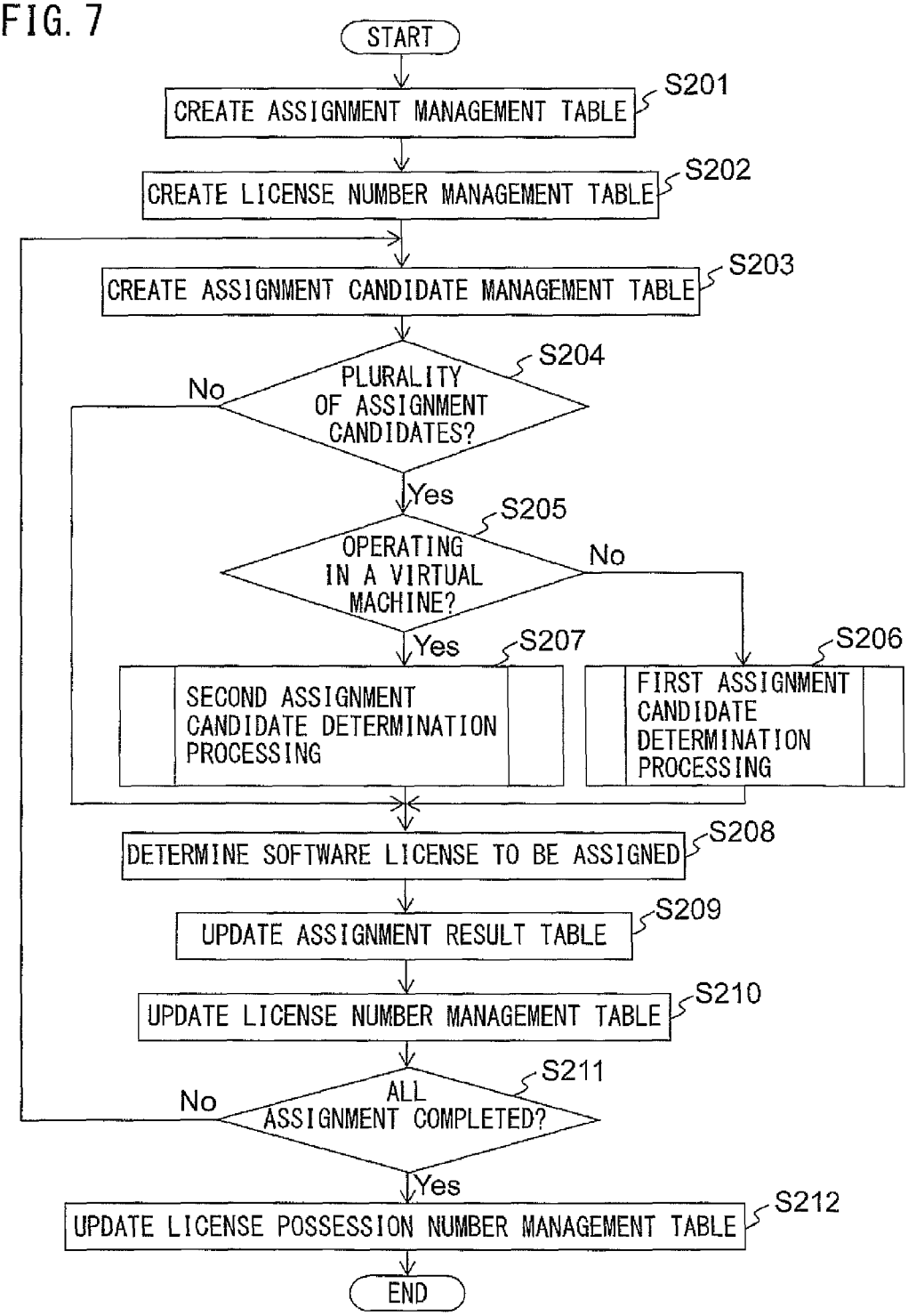
FIG. 7 is a flowchart depicting an example of an operation of assignment processing by the server device 100.

FIG. 7 is a flowchart depicting an example of an operation of the assignment processing by the server device 100. The operation flow depicted in FIG. 7 is performed in step S107 of the sequence depicted in FIG. 6.

The determining module 112 initially creates an assignment management table for assigning a software license to a software product that operates in each management target device 400, and stores the assignment management table in the storage device 104 (step S201).

FIG. 8 is a diagram depicting an example of data structure of an assignment management table. The assignment management table stores an assignment ID, a device ID, a virtual machine ID, a product ID, and the like for each combination of a management target device and a software product, to which a software license is assigned. The assignment ID is identification information that is uniquely defined for each management target device and software product to which a software license is to be assigned. The device ID is a device ID of the management target device, the virtual machine ID is a virtual machine ID of a virtual machine that operates on the management target device, and the product ID is a product ID of a software product that operates in the management target device.

The determining module 112 retrieves the device configuration management table, and extracts the device ID, the virtual machine ID, and the product ID for each management target device 400. The determining module 112 assigns an assignment ID for each combination of the extracted device ID and product ID, and stores the assignment ID in the assignment management table in association with the extracted device ID, virtual machine ID, and product ID.

Next, the determining module 112 creates a license number management table that manages the number of licenses for each software license included in the license rule table, and stores the license number management table in the storage device 104 (step S202).

FIG. 9 is a diagram depicting an example of data structure of the license number management table. The license number management table stores a license rule ID, a product ID, a number of possessed licenses, a number of remaining licenses, and the like for each software license. The number of remaining licenses indicates the number of currently remaining licenses, and the number of possessed licenses is stored as an initial value of the number of remaining licenses.

The determining module 112 retrieves the license rule table, and extracts the license rule ID corresponding to each product ID included in the assignment management table. Further, the determining module 112 retrieves the license possession number management table, and extracts the number of possessed licenses corresponding to the extracted license rule ID. The determining module 112 associates and stores the product ID, the number of possessed licenses, and the number of remaining licenses in the license number management table for each extracted license rule ID.

Processing of the following steps S203 to S211 is performed for each assignment ID stored in the assignment management table.

The determining module 112 creates an assignment candidate management table that indicates software license candidates to be assigned to the software product corresponding to the assignment ID stored in the assignment management table (step S203).

The determining module 112 extracts, among software licenses included in the license rule table, software licenses by which the software product that operates in the management target device is included in product types of software products to be usable. Further, the determining module 112 extracts, among the extracted software licenses, software licenses which the device specification of the management target device meets the device specification condition capable of assigning. Then, the determining module 112 stores the extracted software licenses in the assignment candidate management table as candidates of software licenses to be assigned to the corresponding software product. Hereinafter, the candidate of the software license to be assigned to the software product is referred to as an assignment candidate.

FIG. 10 is a diagram depicting an example of data structure of an assignment candidate management table for a specific assignment ID. The assignment candidate management table stores a license rule ID, a number of usage licenses, a virtual machine flag, an applicable product ID, a device specification condition, a virtual machine condition, a price, and the like, for each assignment candidate. The license rule ID is a license rule ID of a software license that is assignable to the software product corresponding to the assignment ID. The number of usage licenses is the number of software licenses required for the management target device corresponding to the assignment ID. The virtual machine flag is a flag that indicates whether or not the software product corresponding to the assignment ID operates in a virtual machine. The applicable product ID is a product ID of a software product to which the software license of the license rule ID is applicable. The device specification condition and the virtual machine condition are a device specification condition and a virtual machine condition that are defined for the software license. The price is a price of the software license.

The determining module 112 extracts, from the license rule table, all software licenses that correspond to a product ID associated with the specific assignment ID in the assignment management table. Further, the determining module 112 extracts, from the extracted software licenses, software licenses of which the device specification information corresponding to the device ID indicated in the assignment management table meets the device specification condition indicated in the license rule table, in the device configuration management table.

The determining module 112 writes the license rule IDs that correspond to the extracted software licenses into the assignment candidate management table. Further, the determining module 112 writes the number of usage licenses into the assignment candidate management table. For example, when software licenses are needed for the number of CPUs that the management target device includes, the determining module 112 retrieves the number of CPUs corresponding to the device ID associated with the assignment ID from the device configuration management table, and defines the number of CPUs as the number of usage licenses. Further, the determining module 112 writes the virtual machine flag into the assignment candidate management table. The determining module 112 retrieves a virtual machine specification condition corresponding to the device ID and product ID associated with the assignment ID from the device configuration management table, and sets a virtual machine flag according to whether or not the software product corresponding to the assignment ID operates in a virtual machine. Further, in the first assignment candidate determination processing or the second assignment candidate determination processing as described later herein, the determining module 112 retrieves a product ID, a device specification condition, a virtual machine condition, and a price corresponding to each license rule ID from the license rule table, and writes into the assignment candidate management table.

Next, the determining module 112 determines whether or not there is a plurality of assignment candidates in the created assignment candidate management table (step S204).

When there is not a plurality of assignment candidates in the assignment candidate management table, the determining module 112 transfers the processing to step S208. Whereas, when there is a plurality of assignment candidates in the assignment candidate management table, the determining module 112 determines whether or not the software product to which a license is assigned operates in a virtual machine (step S205). The determining module 112 determines whether or not the software product to which a license is assigned operates in a virtual machine based on the virtual machine flag of the assignment candidate in the assignment candidate management table.

When the software product to which a license is assigned does not operate in the virtual machine, the determining module 112 performs the first assignment candidate determination processing that determines an assignment candidate with the highest priority from the plurality of assignment candidates included in the assignment candidate management table (step S206). The determining module 112 determines, in the first assignment candidate determination processing, the assignment candidate with the highest priority from assignment candidates to which a virtual machine condition is not defined. In the first assignment candidate determination processing, the determining module 112 determines the assignment candidate based on the number of possessed licenses, the number of product types of software products to be usable by the software licenses, or device specification conditions in which the software licenses can be assigned. Details of the first assignment candidate determination processing will be described later herein.

Whereas, when the software product to which a license is assigned operates in a virtual machine, the determining module 112 performs the second assignment candidate determination processing that determines the assignment candidate with the highest priority from assignment candidates including assignment candidates assignable to a virtual machine (step S207). The determining module 112, in the second assignment candidate determination processing, determines the assignment candidate with the highest priority among assignment candidates assignable to a physical machine and assignment candidates assignable to a virtual machine. Details of the second assignment candidate determination processing will be described later herein.

Next, the determining module 112 determines a software license to be assigned to the management target device (step S208). When there is only one assignment candidate in the assignment candidate management table in step S204, the determining module 112 determines the assignment candidate as the software license to be assigned to the management target device. Whereas, when there is a plurality of assignment candidates in the assignment candidate management table, the determining module 112 determines the assignment candidate, that is determined as the highest priority by the first assignment candidate determination processing or the second assignment candidate determination processing, as the software license to be assigned to the management target device.

Next, the assigning module 113 assigns the software license determined by the determining module 112 to the management target device, and writes the license rule ID corresponding to the assigned software license into the assignment result table (step S209).

FIG. 11 is a diagram depicting an example of data structure of the assignment result table. The assignment result table stores a device ID, a product ID, a license rule ID, and the like for each assignment ID. The device ID is a device ID of the management target device to which the software license is assigned. The product ID is a product ID of the software product to which the software license is assigned. The license rule ID is a license rule ID corresponding to the software license.

Next, the assigning module 113 subtracts the number of usage licenses in the assignment candidate management table from the number of remaining licenses of the assigned software license in the license number management table (step S210).

Next, the assigning module 113 determines whether or not assignment of software licenses is completed for all assignment IDs included in the assignment management table (step S211). When there is an assignment ID for which assignment of a software license is not completed, the assigning module 113 returns the processing to step S203, and repeats the processing of steps S203 to S211.

Whereas, when assignment of software licenses is completed for all the assignment IDs, the assigning module 113 updates the license possession number management table (step S212), and terminates a series of steps. The assigning module 113 writes the number of remaining licenses of each software license stored in the license number management table, into the corresponding number of possessed licenses in the license possession number management table. After this processing, in step S108 of FIG. 6, respective information indicated in the assignment result table is transmitted to the management device 200 as the assignment result.

Figure 12:
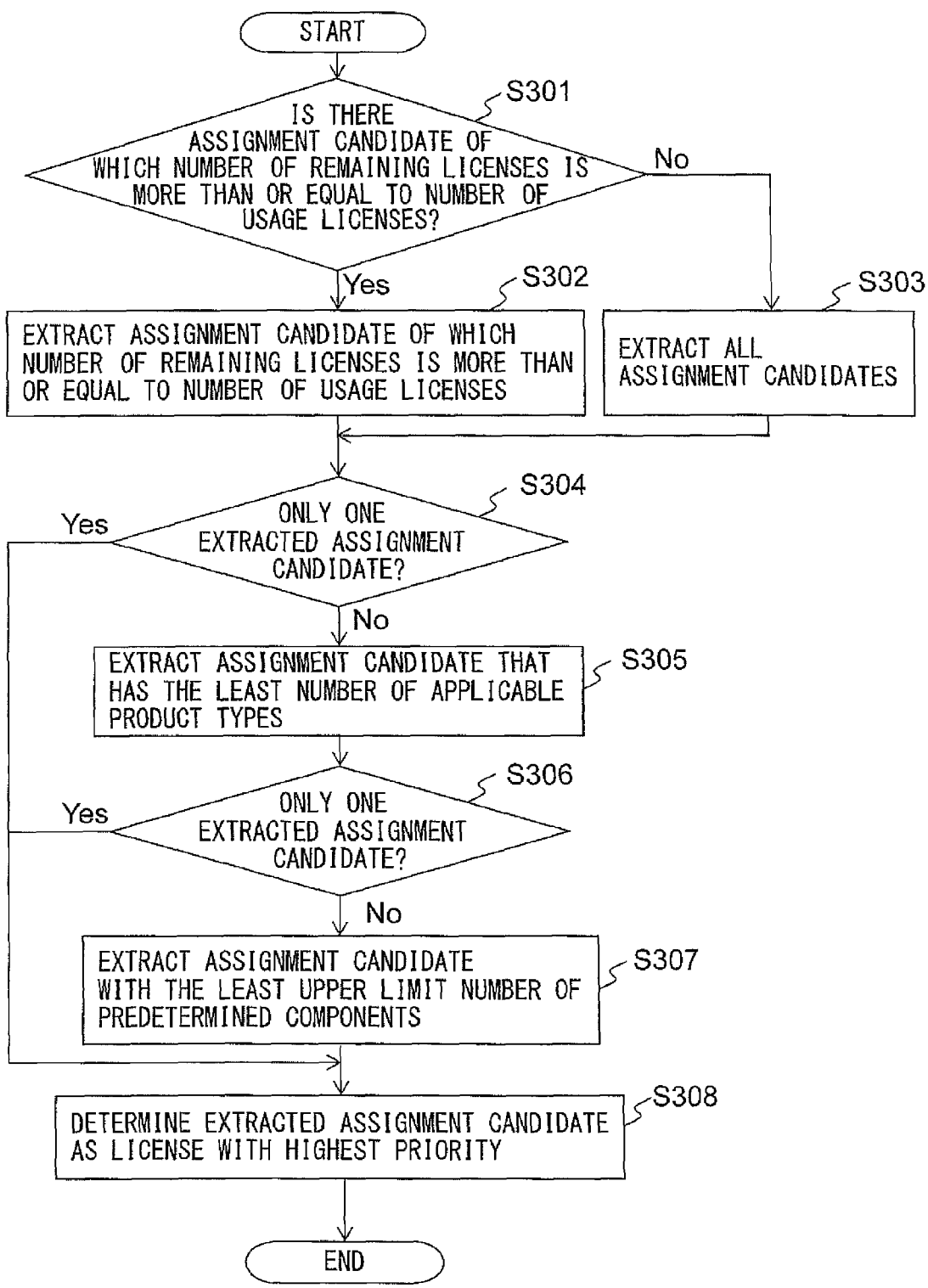
FIG. 12 is a flowchart depicting an example of an operation of first assignment candidate determination processing.

FIG. 12 is a flowchart depicting an example of an operation of the first assignment candidate determination processing by the server device 100. The operation flow depicted in FIG. 12 is performed in step S206 of the sequence depicted in FIG. 7.

The determining module 112 initially determines whether or not there is an assignment candidate of which number of remaining licenses is more than or equal to the number of usage licenses in the assignment candidate management table (step S301). The determining module 112 determines, among license rule IDs included in the assignment candidate management table, whether there is a license rule ID of which number of remaining licenses correspondingly stored in the license number management table is more than or equal to the number of usage licenses stored in the assignment candidate management table.

When there is an assignment candidate of which number of remaining licenses is more than or equal to the number of usage licenses, the determining module 112 extracts all assignment candidates of which number of remaining licenses is more than or equal to the number of usage licenses (step S302). Whereas, when there is no assignment candidate of which number of remaining licenses is more than or equal to the number of usage licenses, the determining module 112 extracts all assignment candidates included in the assignment candidate management table (step S303).

Next, the determining module 112 determines whether or not there is only one assignment candidate extracted in step S302 or S303 (step S304).

When there is only one extracted assignment candidate, in other words, when there is only one assignment candidate of which number of remaining licenses is more than or equal to the number of usage licenses, the determining module 112 determines the extracted assignment candidate as the assignment candidate with the highest priority (step S308), and terminates a series of steps.

Whereas, when there is a plurality of extracted assignment candidates, the determining module 112 extracts an assignment candidate with the least number of product types of software products that are usable by the assignment candidate (step S305). The determining module 112 retrieves, from the license rule table, a product ID associated with each license rule ID included in the assignment candidate management table, and writes the product ID into the assignment candidate management table. The determining module 112 extracts an assignment candidate with the least number of corresponding applicable product IDs among assignment candidates included in the assignment candidate management table.

Next, the determining module 112 determines whether or not there is only one assignment candidate extracted in step S305 (step S306).

When there is only one assignment candidate extracted in step S305, the determining module 112 determines the extracted assignment candidate as the assignment candidate with the highest priority (step S308), and terminates a series of steps. Thus, when there is a plurality of assignment candidates of which number of remaining licenses is more than or equal to the number of usage licenses, the determining module 112 determines the assignment candidate with the least number of product types of software products that are usable by the assignment candidate as the assignment candidate with the highest priority. As such, software licenses that have many product types of usable software products can be kept without being assigned, which increases the possibility of assigning the remaining software licenses to other management target devices. Therefore, applicability of software licenses to the management target devices in total can be improved.

Whereas, when there is a plurality of assignment candidates extracted in step S305, the determining module 112 extracts an assignment candidate with the least upper limit number of predetermined components specified in the device specification condition (step S307). The determining module 112 retrieves, from the license rule table, a device specification condition associated with each license rule ID included in the assignment candidate management table, and writes the device specification condition into the assignment candidate management table. The determining module 112 extracts an assignment candidate with the least upper limit number of predetermined components specified in the device specification condition among assignment candidates included in the assignment candidate management table. As such, software licenses with lenient device specification conditions can be kept without being assigned, which increases possibility to assign the remaining software licenses to other management target devices. Therefore, applicability of software licenses to the management target devices in total can be improved.

Next, the determining module 112 determines the extracted assignment candidate as the assignment candidate with the highest priority (step S308), and terminates a series of steps. Thus, when there is a plurality of assignment candidates of which number of remaining licenses is more than or equal to the number of usage licenses, the determining module 112 determines the assignment candidate with the least upper limit number of predetermined components specified in the device specification condition as the assignment candidate with the highest priority. Note that, when there is a plurality of assignment candidates extracted in step S307, the determining module 112 determines the assignment candidate that is recorded at the top (upper side) of the assignment candidate management table, among the extracted assignment candidates, as the assignment candidate with the highest priority.

FIGS. 13A to 13E are diagrams depicting examples of the assignment candidate management table used for illustrating examples in which the first assignment candidate determination processing determines a software license to be assigned to the management target device. Note that FIGS. 13A to 13E illustrate examples in which one license is required for one CPU.

FIG. 13A depicts an assignment candidate management table created for an assignment ID (A001) of the assignment management table depicted in FIG. 8. In the assignment management table of FIG. 8, the assignment ID (A001) is associated with a product ID (P001) and a device ID (D001), while a virtual machine ID is not set. In the license rule table of FIG. 3A, the product ID (P001) is associated with license rule IDs (L001) and (L002). Further, each of the license rule IDs (L001) and (L002) is associated with a device specification condition (upper limit number of CPUs: unlimited) and a virtual machine condition (not applicable (N/A)). In the device configuration management table of FIG. 4, the device ID (D001) is associated with device specification information (number of CPUs: 2). Since the device specification information (number of CPUs: 2) satisfies the device specification condition (upper limit number of CPUs: unlimited), the license rule IDs (L001) and (L002) are written into the assignment candidate management table of FIG. 13A. Further, in the assignment candidate management table, the number of CPUs (2) of the management target device is written as a number of usage licenses, and (off) is written as a virtual machine flag.

In the assignment candidate management table of FIG. 13A, there are two license rule IDs (L001) and (L002) of which number of remaining licenses (2) in the license number management table of FIG. 9 is more than or equal to the number of usage licenses (2) in the assignment candidate management table. As such, in the assignment candidate management table, an applicable product for each license rule ID is written based on the license rule table of FIG. 3A. In the assignment candidate management table, applicable products (P001) and (P002) are written for the license rule ID (L001), and an applicable product (P001) is written for the license rule ID (L002). Then, the assignment candidate of the license rule ID (L002) that has the least number of corresponding applicable product IDs is determined as the software license to be assigned to the management target device. Further, in the license number management table of FIG. 9, the number of remaining licenses of the license rule ID (L002) is updated to (0).

FIG. 13B depicts an assignment candidate management table created for an assignment ID (A002) of the assignment management table depicted in FIG. 8. In the assignment candidate management table of FIG. 13B, license rule IDs (L003) and (L004) are written in the same way as the assignment candidate management table of FIG. 13A. In the assignment candidate management table of FIG. 13B, since the numbers of applicable product IDs corresponding to the license rule IDs (L003) and (L004) are the same, a device specification condition is written for each license rule ID based on the license rule table of FIG. 3A. In the assignment candidate management table, a device specification condition (upper limit number of CPUs: unlimited) is written for the license rule ID (L003), and a device specification condition (upper limit number of CPUs: 2) is written for the license rule ID (L004). Then, the assignment candidate of the license rule ID (L004) that has the least upper limit number of CPUs is determined as the software license to be assigned to the management target device. Further, in the license number management table of FIG. 9, the number of remaining licenses of the license rule ID [L004] is updated to (0).

FIG. 13C depicts an assignment candidate management table created for an assignment ID (A003) of the assignment management table depicted in FIG. 8. In the assignment candidate management table of FIG. 13C, only a license rule ID (L001) is written in the same way as the assignment candidate management table of FIG. 13A. Since the license rule is only one in the assignment candidate management table of FIG. 13C, the assignment candidate of the license rule ID (L001) is determined as the software license to be assigned to the management target device. Further, in the license number management table of FIG. 9, the number of remaining licenses of the license rule ID (L001) is updated to (0).

As described above, since the software license of the license rule ID (L001) that is assignable to the product ID (P002) is not assigned to the assignment ID (A001), the software license of the license rule ID (L001) can be assigned to the assignment ID (A003). As such, software licenses can be efficiently assigned to the management target devices.

FIG. 13D depicts an assignment candidate management table created for an assignment ID (A004) of the assignment management table depicted in FIG. 8. In the assignment candidate management table of FIG. 13D, only the license rule ID (L003) is written in the same way as the assignment candidate management table of FIG. 13A. Since the license rule is only one in the assignment candidate management table of FIG. 13D, the assignment candidate of the license rule ID (L003) is determined as the software license to be assigned to the management target device. Further, in the license number management table of FIG. 9, the number of remaining licenses of the license rule ID (L003) is updated to (0).

As described above, the software license of the license rule ID (L003) that is assignable to the product ID (P003) and of which device specification condition is (upper limit number of CPUs: unlimited) is not assigned to the assignment ID (A002). Therefore, the software license of the license rule ID (L003) can be assigned to the management target device of the device ID (D002) of which the number of CPUs is (4). As such, software licenses can be efficiently assigned to the management target devices.

FIG. 13E depicts an assignment candidate management table created for an assignment ID (A005) of the assignment management table depicted in FIG. 8. In the assignment candidate management table of FIG. 13E, only the license rule ID (L005) is written in the same way as the assignment candidate management table of FIG. 13A. Since the license rule is only one in the assignment candidate management table of FIG. 13E, the assignment candidate of the license rule ID (L005) is determined as the software license to be assigned to the management target device. Further, in the license number management table of FIG. 9, the number of remaining licenses of the license rule ID (L005) is updated to (−4).

As such, by managing the remaining number of software licenses using a negative number, an administrator can easily and correctly determine the deficient number of software licenses.

Figure 14:
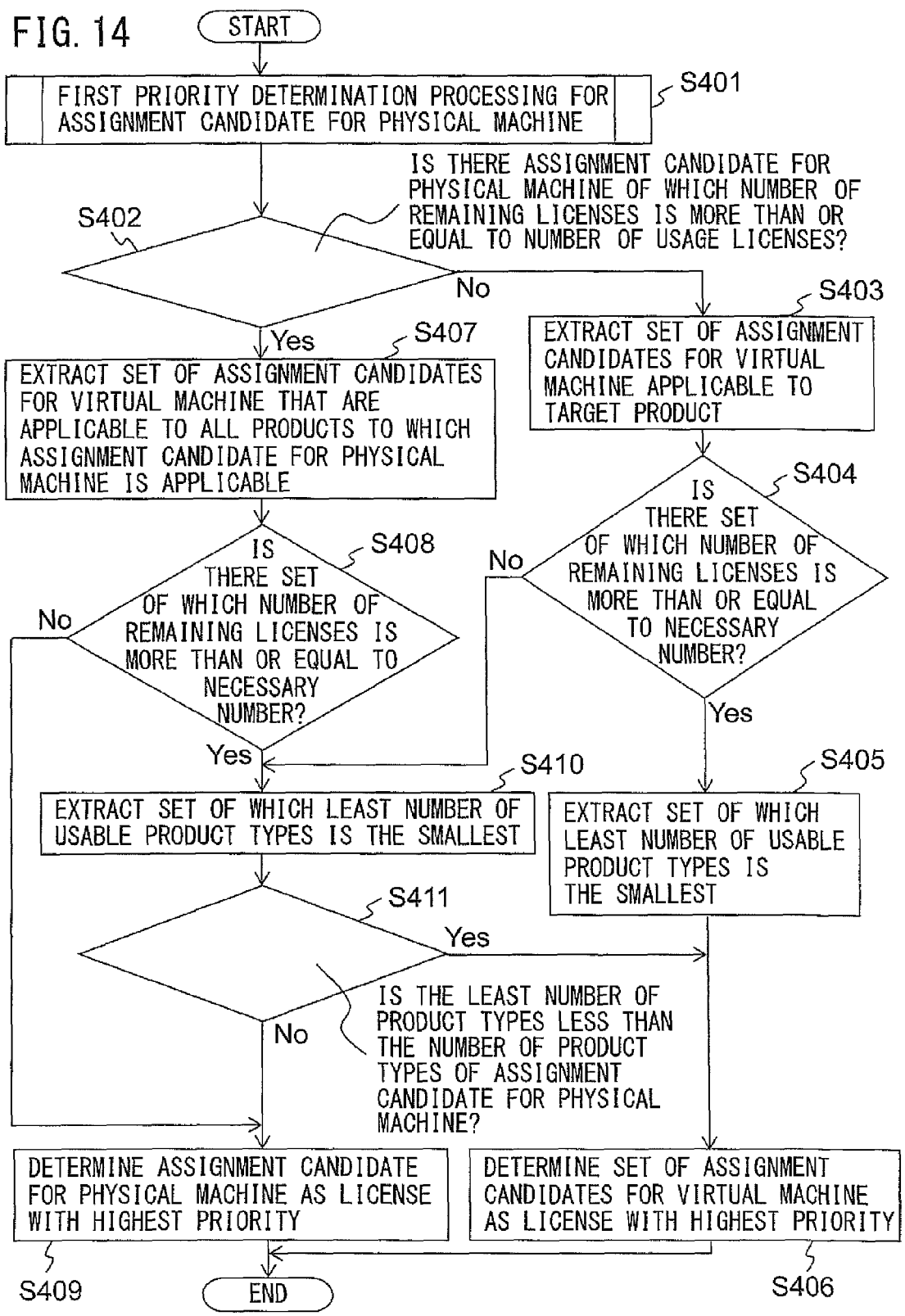
FIG. 14 is a flowchart depicting an example of an operation of second assignment candidate determination processing.

FIG. 14 is a flowchart depicting an example of an operation of the second assignment candidate determination processing by the server device 100. The operation flow depicted in FIG. 14 is performed in step S207 of the sequence depicted in FIG. 7.

The determining module 112 initially performs the first assignment candidate determination processing, as depicted in FIG. 12, for assignment candidates that are assignable to physical machines and included in the assignment candidate management table (step S401). The determining module 112 retrieves, from the license rule table, a virtual machine condition associated with each license rule ID included in the assignment candidate management table, and writes the virtual machine condition into the assignment candidate management table. The determining module 112 extracts, from the assignment candidate management table, an assignment candidate of which virtual machine condition indicates that the assignment candidate is assignable to a physical machine, and performs the first assignment candidate determination processing for the extracted assignment candidate.

Next, the determining module 112 determines whether or not there is an assignment candidate, in step S401 of the first assignment candidate determination processing, of which number of remaining licenses is more than or equal to the number of usage licenses, among the assignment candidates that are assignable to physical machines (step S402).

When there is no assignment candidate of which number of remaining licenses is more than or equal to the number of usage licenses, the determining module 112 extracts a set of assignment candidates that are assignable to virtual machines and applicable to the target software product, from the assignment candidate management table (step S403).

Next, the determining module 112 determines whether there is a set of assignment candidates of which number of remaining licenses is more than or equal to a necessary number among the extracted sets (step S404). The determining module 112 determines whether, when all assignment candidates included in each set are assigned, the number of remaining licenses of each assignment candidate stored in the license number management table becomes 0 or more. When there is a set where the number of remaining licenses of every assignment candidate becomes 0 or more, the determining module 112 determines that there is a set of which number of remaining licenses is more than or equal to the necessary number. Whereas, when there is no set where the number of remaining licenses of every assignment candidate becomes 0 or more, the determining module 112 determines that there is no set of which number of remaining licenses is more than or equal to the necessary number.

When there is no set of which number of remaining licenses is more than or equal to the necessary number, the determining module 112 transfers the processing to step S410. Whereas, when there is a set of which number of remaining licenses is more than or equal to the necessary number, the determining module 112 extracts a set in which the least number of product types of software products that are usable by each assignment candidate included in the set is the smallest (step S405).

Next, the determining module 112 determines each assignment candidate included in the extracted set as the assignment candidate with the highest priority (step S406), and terminates a series of steps.

Whereas, when there is an assignment candidate of which number of remaining licenses is more than or equal to the usage license number in step S402, the determining module 112 extracts all software products that are applicable by assigning the assignment candidate determined in step S401, from the device configuration management table. Then, the determining module 112 extracts a set of assignment candidates that are assignable to virtual machines and can cover all the extracted software products, from the assignment candidate management table (step S407).

Next, the determining module 112 determines whether or not there is a set of which number of remaining licenses is more than or equal to the necessary number among the extracted sets (step S408).

When there is no set of which remaining license number is more than or equal to the necessary number, the determining module 112 determines the assignment candidate that is assignable to physical machines and determined in step S401, as the assignment candidate with the highest priority (step S409), and terminates a series of steps.

Whereas, when there is a set of which number of remaining licenses is more than or equal to the necessary number, the determining module 112 extracts a set in which the least number of product types of software products that are usable by each assignment candidate included in the set is the smallest (step S410). Note that, when there is no set of which number of remaining licenses is more than or equal to the necessary number in step S404, the determining module 112 extracts a set in which the above-described least number is the smallest among the sets extracted in step S403.

Next, the determining module 112 determines whether or not the above-described least number pertaining to the extracted set is less than the number of product types of software products that are usable by the assignment candidate that is assignable to a physical machine and determined in step S401 (step S411).

When the above-described least number is less than the number of product types pertaining to the assignment candidate assignable to a physical machine, the determining module 112 determines each assignment candidate included in the extracted set as the assignment candidate with the highest priority (step S406), and terminates a series of steps.

Whereas, when the above-described least number is more than or equal to the number of product types pertaining to the assignment candidate assignable to a physical machine, the determining module 112 determines the assignment candidate assignable to the physical machine as the assignment candidate with the highest priority (step S409), and terminates a series of steps.

As such, when a software product operates in a virtual machine on the management target device, the determining module 112 determines either one assignment candidate that is assignable to a physical machine or a plurality of assignment candidates that are assignable to virtual machines, as the assignment candidate with the highest priority. Note that the determining module 112 may perform the second assignment candidate determination processing only when a plurality of software products operate in a plurality of virtual machines on the management target device.

Further, as described above, the determining module 112 determines the software license to be assigned to the management target device, based on the number of product types pertaining to one assignment candidate assignable to a physical machine and the least number among the numbers of product types pertaining to each assignment candidate assignable to a virtual machine.

Note that the determining module 112 may determine the software license to be assigned to the management target device based on the upper limit number of predetermined components specified in the device specification condition for each assignment candidate. In other words, the determining module 112 may determine the software license to be assigned to the management target device, based on the upper limit number pertaining to one assignment candidate assignable to a physical machine and the least number among the upper limit numbers pertaining to each assignment candidates assignable to a virtual machine.

In such a case, in steps S405 and S410, the determining module 112 extracts a set in which the least number of the upper limit numbers of predetermined components specified in the device specification condition of each assignment candidate included in each set is the smallest. Further, in step S411, the determining module 112 determines whether or not the above-described least number pertaining to the extracted set is less than the upper limit number of predetermined components specified in the device specification condition of the assignment candidate that is assignable to a physical machine and determined in step S401. When the above-described least number is less than the upper limit number pertaining to the assignment candidate assignable to a physical machine, then, the determining module 112 determines each assignment candidate included in the extracted set as the assignment candidate with the highest priority. Whereas, when the above-described least number is more than or equal to the upper limit number pertaining to the assignment candidate assignable to a physical machine, the determining module 112 determines the assignment candidate assignable to the physical machine as the assignment candidate with the highest priority.

Further, the determining module 112 may determine a software license to be assigned to the management target device based on a price of one assignment candidate assignable to a physical machine and a total price of respective assignment candidates assignable to virtual machines.

In such a case, the determining module 112 determines, in step S411, whether or not the total price of respective assignment candidates included in the extracted set is less than the price of the assignment candidate that is assignable to a physical machine and determined in step S401. Then, when the total price of respective assignment candidates included in the extracted set is less than the price of the assignment candidate assignable to a physical machine, the determining module 112 determines each assignment candidate included in the extracted set as the assignment candidate with the highest priority. Whereas, when the total price of respective assignment candidates included in the extracted set is more than or equal to the price of the assignment candidate assignable to a physical machine, the determining module 112 determines the assignment candidate assignable to the physical machine as the assignment candidate with the highest priority.

FIG. 15 is a diagram depicting an example of the assignment candidate management table used for illustrating an example in which the second assignment candidate determination processing determines a software license to be assigned to the management target device.

FIG. 15 depicts an assignment candidate management table created for an assignment ID (A006) of the assignment management table depicted in FIG. 8. In the assignment management table of FIG. 8, the assignment ID (A006) is associated with a product ID (P005), a device ID (D003), and a virtual machine ID (V001). In the license rule table of FIG. 3A, the product ID (P005) is associated with license rule IDs (L006) to (L009). Further, the license rule IDs (L006) and (L007) are respectively associated with a virtual machine condition (physical), and the license rule IDs (L008) and (L009) are respectively associated with a virtual machine condition (virtual). Thus, in the assignment candidate management table of FIG. 15, the license rule IDs (L006) to (L009) of which virtual machine condition is (physical) or (virtual) are written, and (on) is written as the virtual machine flag.

In the assignment candidate management table of FIG. 15, initially, the assignment candidate of the license rule ID (L007) of which upper limit number of CPUs is the smallest is selected among the license rule IDs (L006) and (L007) of which virtual machine condition is (physical). Next, the product IDs (P005) and (P006) of all software products that are applicable by assigning the assignment candidate of the rule ID (L007), are extracted from the device configuration management table. Next, a set of the license rule IDs (L008) and (L009) that are applicable to the product IDs (P005) and (P006) and of which virtual machine condition is (virtual), are extracted from the assignment candidate management table. The least number among the numbers of applicable product IDs corresponding to the license rule IDs (L008) and (L009) is one, while the number of applicable product IDs corresponding to the license rule ID (L007) is two. Thus, a set of assignment candidates of the license rule IDs (L008) and (L009) of which virtual machine condition is (virtual), is determined as the software license to be assigned to the management target device. As such, both assignment candidates of the license rule IDs (L008) and (L009) are assigned for the assignment IDs (A006) and (A007) that are respectively associated with the product IDs (P005) and (P006) in the assignment management table depicted in FIG. 8. Further, in the license number management table of FIG. 9, the number of remaining licenses of the license rule IDs (L008) and (L009) are respectively updated to (0).

Since the assignment candidate of the license rule ID (L009) is assigned to the software product pertaining to the assignment ID (A007) in the assignment management table depicted in FIG. 8 from the above-described processing, the assignment processing for the assignment ID (A007) is omitted.

Note that the upper limit number of CPUs corresponding to the license rule IDs (L008) and (L009) is unlimited, while the upper limit number of CPUs corresponding to the license rule ID (L007) is four. Therefore, when the software license to be assigned to the management target device is determined based on the upper limit number of CPUs, the assignment candidate of the license rule ID (L007) is determined as the software license to be assigned to the management target device.

In such a case, since the software product pertaining to the assignment ID (A007) of the assignment management table depicted in FIG. 8 is covered by the assignment candidate of the license rule ID (L007), the assignment processing for the assignment ID (A007) is omitted.

As a result of assigning software licenses, which is determined by the processing illustrated with reference to FIGS. 13A to 13E, and 15, the assignment result table depicted in FIG. 11 is created.

As described in details above, the server device 100 determines the software license to be assigned to the management target device, by operating in accordance with the sequence of FIG. 6 and flowcharts of FIGS. 7, 12, and 14, based on the number of licenses, the number of product types, or a device specification condition. As such, the server device 100 is enabled to efficiently assign software licenses to management target devices.

Particularly, optimum assignment is made possible when there are software licenses that cover only software products of a predetermined version, and software licenses that can cover (can downgrade) software products of a predetermined version and prior versions. The server device 100 preferentially assigns software licenses that cover only software products of a predetermined version to management target devices that use the software products of the predetermined version. As such, thereafter, the server device 100 can assign software licenses that can cover software products of a predetermined version and prior versions to management target devices that use the software products of the prior versions.

Further, the server device 100 is enabled to efficiently assign software licenses even when virtual machines are operating on the management target devices, by managing physical devices and virtual machines in association with one another. Particularly, the server device 100 is enabled to appropriately assign software licenses to management target devices even when the number of virtual machines operating on the management target device frequently changes.

Although the typical embodiments of the present invention have been described so far, the present invention is not limited to those embodiments. For example, the determining module 112 may redetermine a software license to be assigned to other management target devices to which other software licenses are already assigned, at a predetermined timing. For example, when there is no software license of which number of remaining licenses is more than or equal to the number of usage licenses in step S301 of FIG. 12, the determining module 112 may redetermine a software license to be assigned to other management target devices. As such, the server device 100 can appropriately reexamine assignment of licenses.

Further, the determining module 112, by skipping the processing of steps S301 to S304 of FIG. 12, may determine a software license to be assigned without using the number of possessed licenses. Further, by skipping the processing of steps S305 and S306 of FIG. 12, the determining module 112 may determine a software license to be assigned without using the number of product types of software products that are usable by the software license. Further, by skipping the processing of steps S306 and S307 of FIG. 12, the determining module 112 may determine a software license to be assigned without using a device specification condition in which the software license can be assigned.

FIG. 16 is a flowchart depicting another example of an operation of the first assignment candidate determination processing. The following will describe another example of an operation of the first assignment candidate determination processing with reference to the flowchart depicted in FIG. 16. This flowchart can be performed by the server device 100 in replacement of the flowchart depicted in the above-described FIG. 12.

The following will describe only the processing of steps S505 to S509 without describing the processing of steps S501 to S504 and S510 depicted in FIG. 16, since the processing of steps S501 to S504 and S510 are the same processing as steps S301 to S304 and S308 depicted in FIG. 12.

When there is a plurality of assignment candidates extracted in step S504, the determining module 112 extracts the assignment candidate with the least number of product types of software products that are usable by the assignment candidates (step S505).

Next, the determining module 112 extracts the assignment candidate with the least upper limit number of predetermined components specified in the device specification condition (step S506).

Next, the determining module 112 determines whether or not the assignment candidate with the least number of product types of software products usable by the assignment candidate is the same as the assignment candidate with the least upper limit number of predetermined components specified in the device specification condition (step S507).

Next, when the assignment candidate with the least number of product types is the same as the assignment candidate with the least upper limit number of predetermined components, the determining module 112 extracts the assignment candidate (step S508).

Whereas, when the assignment candidate with the least number of product types differs from the assignment candidate with the least upper limit number of predetermined components, the determining module 112 extracts the lowest-priced assignment candidate (step S509). The determining module 112 retrieves, from the license rule table, a price associated with each license rule ID included in the assignment candidate management table, and writes the price into the assignment candidate management table. The determining module 112 extracts the assignment candidate of which corresponding price is the lowest among assignment candidates included in the assignment candidate management table.

As such, when the assignment candidate with the least number of product types differs from the assignment candidate with the least upper limit number of predetermined components, the determining module 112 determines the software license to be assigned to the management target device based on the price.

As described above in details, the server device 100 determines a software license to be assigned to the management target device by operating in accordance with the flowchart of FIG. 16 based on prices of software licenses. As such, the server device 100 is enabled to decrease a cost of necessary software licenses. Further, when the number of possessed licenses is deficient, since the number of possessed licenses of the lowest-priced software license becomes a negative number, an administrator can appropriately select and purchase the lowest-priced software license. Further, when the possessed licenses are excessive, the higher-priced possessed licenses are kept unused. Then, by canceling the license agreement of the remaining possessed licenses, the license cost in total can be adequately decreased.

According to the information processing device, a license assignment method and the computer-readable, non-transitory medium, an information processing device determines software licenses to be assigned to management target devices, based on the number of possessed licenses, the number of product types of software products to be usable by the software licenses, or a device specification condition in which the licenses can be assigned. As such, the information processing device, the license assignment method, and the computer-readable, non-transitory medium, that can efficiently assign software licenses to management target devices, can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A license assignment method for an information processing device including a storage, comprising:
   storing a plurality software licenses of different types in the storage, each in association with a number of possessed licenses, a product type of a software product that is usable by the software license, and a device specification condition for which the software license can be assigned;
   receiving information about a software product operating in a management target device and information about a device specification of the management target device;
   determining a software license among the plurality of software licenses to be assigned to the management target device based on the number of possessed licenses, a number of the product types, or the device specification condition, when there is a plurality of software licenses for which the software product operating in the management target device is included in the product types and the device specification of the management target device meets the device specification condition; and
   assigning, using a computer, the determined software license to the management target device,
   wherein the computer determines a software license of which the number of possessed licenses is more than or equal to a number of licenses used for the management target device as a software license to be assigned to the management target device, when there is one software license of which the number of possessed licenses is more than or equal to the number of used licenses, among software licenses for which the software product operating in the management target device is included in the product type and the device specification of the management target device meets the device specification condition in the determining step.

2. The license assignment method according to claim 1, wherein,
   the computer determines a software license of which a number of the product types is the least among software licenses of which the number of possessed licenses is more than or equal to a number of licenses used for the management target device as a software license to be assigned to the management target device, when there is a plurality of software licenses of which the number of possessed licenses is more than or equal to the number of used licenses, among software licenses for which the software product operating in the management target device is included in the product type and the device specification of the management target device meets the device specification condition in the determining step.

3. The license assignment method according to claim 1, wherein
the storage stores an upper limit number of predetermined components included in the management target device as the device specification condition, and
the computer determines a software license of which the upper limit number is the least among software licenses of which the number of possessed licenses is more than or equal to a number of licenses used for the management target device as a software license to be assigned to the management target device, when there is a plurality of software licenses of which the number of possessed licenses is more than or equal to the number of used licenses, among software licenses for which the software product operating in the management target device is included in the product type and the device specification of the management target device meets the device specification condition in the determining step.

4. The license assignment method according to claim 1, wherein
the storage stores an upper limit number of predetermined components included in the management target device as the device specification condition, and stores the plurality types of software licenses further in association with a price of the software license, and
the computer determines a software license to be assigned to the management target device based on the price when a software license of which a number of the product types is the least differs from a software license of which the upper limit number is the least among software licenses of which the number of possessed licenses is more than or equal to a number of licenses used for the management target device, when there is a plurality of software licenses of which the number of possessed licenses is more than or equal to the number of used licenses, among software licenses for which the software product operating in the management target device is included in the product type and the device specification of the management target device meets the device specification condition in the determining step.

5. The license assignment method according to claim 1, wherein
the storage stores the plurality types of software licenses further in association with a virtual machine condition that indicates whether the software license is assignable to all virtual machines that operate on the management target device or only one virtual machine, and
the computer extracts, when a plurality of software products operate in a plurality of virtual machines on the management target device, one first software license that the virtual machine condition indicates is assignable to all virtual machines and a plurality of second software licenses that the virtual machine condition indicates are applicable to only one virtual machine, the first software license and the plurality of second software licenses being assignable to the plurality of software products, and determines either the first software license or the plurality of second software licenses as a software license to be assigned to the management target device in the determining step.

6. The license assignment method according to claim 1, wherein
the computer determines a software license to be assigned to the management target device, based on a number of the product types of the first software license and a least number among numbers of the product types of the plurality of second software licenses, in the determining step.

7. The license assignment method according to claim 1, wherein
the storage further stores an upper limit number of predetermined components included in the management target device as the device specification condition, and
the computer determines a software license to be assigned to the management target device based on the upper limit number of the first software license and a least number of the respective upper limit numbers of the plurality of second software licenses, in the determining step.

8. The license assignment method according to claim 1, wherein
the storage stores the plurality types of software licenses further in association with a price of the software license, and
the computer determines a software license to be assigned to the management target device based on a price of the first software license, and a total of respective prices of the plurality of second software licenses, in the determining step.

9. The license assignment method according to claim 1, wherein the computer redetermines a software license to be assigned to other management target device to which a software license is already assigned, when there is no software license of which the number of possessed licenses is more than or equal to a number of licenses used for the management target device, among software licenses for which a software product operating in the management target device is included in the product type and the device specification of the management target device meets the device specification condition, in the determining step.

10. An information processing device comprising:
a storage for storing a plurality types of software licenses in association with a number of possessed licenses, a product type of a software product that is usable by the software license, and a device specification condition for which the software license can be assigned;
a receiver for receiving information about a software product operating in a management target device and information about a device specification of the management target device;
a determining circuit for determining a software license to be assigned to the management target device based on the number of possessed licenses, a number of the product types, or the device specification condition, when there is a plurality of software licenses, for which the software product operating in the management target device is included in the product type and the device specification of the management target device meets the device specification condition, among the plurality types of software licenses; and
an assigning circuit for assigning a software license determined by the determining circuit to the management target device,
wherein the determining circuit determines a software license of which the number of possessed licenses is more than or equal to a number of licenses used for the management target device as a software license to be assigned to the management target device, when there is one software license of which the number of possessed licenses is more than or equal to the number of used licenses, among software licenses for which the software product operating in the management target device is included in the product type and the device specification of the management target device meets the device specification condition.

11. The information processing device according to claim 10, wherein
the determining circuit determines a software license of which a number of the product types is the least among software licenses of which the number of possessed licenses is more than or equal to a number of licenses used for the management target device as a software license to be assigned to the management target device, when there is a plurality of software licenses of which the number of possessed licenses is more than or equal to the number of used licenses, among software licenses for which the software product operating in the management target device is included in the product type and the device specification of the management target device meets the device specification condition.

12. The information processing device according to claim 10, wherein
the storage stores an upper limit number of predetermined components included in the management target device as the device specification condition, and
the determining circuit determines a software license of which the upper limit number is the least among software licenses of which the number of possessed licenses is more than or equal to a number of licenses used for the management target device as a software license to be assigned to the management target device, when there is a plurality of software licenses of which the number of possessed licenses is more than or equal to the number of used licenses, among software licenses for which the software product operating in the management target device is included in the product type and the device specification of the management target device meets the device specification condition.

13. The information processing device according to claim 10, wherein
the storage stores an upper limit number of predetermined components included in the management target device as the device specification condition, and stores the plurality types of software licenses further in association with a price of the software license, and
the determining circuit determines a software license to be assigned to the management target device based on the price when a software license of which a number of the product types is the least differs from a software license of which the upper limit number is the least among software licenses of which the number of possessed licenses is more than or equal to a number of licenses used for the management target device, when there is a plurality of software licenses of which the number of possessed licenses is more than or equal to the number of used licenses, among software licenses for which the software product operating in the management target device is included in the product type and the device specification of the management target device meets the device specification condition.

14. The information processing device according to claim 10, wherein
the storage stores the plurality types of software licenses further in association with a virtual machine condition that indicates whether the software license is assignable to all virtual machines that operate on the management target device or only one virtual machine, and
the determining circuit extracts, when a plurality of software products operate in a plurality of virtual machines on the management target device, one first software license that the virtual machine condition indicates is assignable to all virtual machines and a plurality of second software licenses that the virtual machine condition indicates are applicable to only one virtual machine, the first software license and the plurality of second software licenses being assignable to the plurality of software products, and determines either the first software license or the plurality of second software licenses as a software license to be assigned to the management target device.

15. The information processing device according to claim 14, wherein
the determining circuit determines a software license to be assigned to the management target device, based on a number of the product types of the first software license and a least number among numbers of the product types of the plurality of second software licenses.

16. The information processing device according to claim 14, wherein
the storage further stores an upper limit number of predetermined components included in the management target device as the device specification condition, and
the determining circuit determines a software license to be assigned to the management target device based on the upper limit number of the first software license and a least number of the respective upper limit numbers of the plurality of second software licenses.

17. The information processing device according to claim 14, wherein
the storage stores the plurality types of software licenses further in association with a price of the software license, and
the determining circuit determines a software license to be assigned to the management target device based on a price of the first software license, and a total of respective prices of the plurality of second software licenses.

18. The information processing device according to claim 10, wherein the determining circuit re-determines a software license to be assigned to another management target device to which a software license is already assigned, when there is no software license of which the number of possessed licenses is more than or equal to a number of licenses used for the management target device, among software licenses for which a software product operating in the management target device is included in the product type and the device specification of the management target device meets the device specification condition.

19. A computer-readable, non-transitory medium storing a computer program, wherein the computer program causes a computer to execute a process, the process comprising:
storing a plurality types of software licenses in the storage, in association with a number of possessed licenses, a product type of a software product that is usable by the software license, and a device specification condition for which the software license can be assigned;
receiving information about a software product operating in a management target device and information about a device specification of the management target device;
determining a software license to be assigned to the management target device based on the number of possessed licenses, a number of the product types, or the device specification condition, when there is a plurality of software licenses for which the software product operating in the management target device is included in the product type and the device specification of the management target device meets the device specification condition, among the plurality types of software licenses; and assigning the determined software license to the management target device, wherein the computer determines a software license of which the number of possessed licenses is more than or equal to a number of licenses used for the management target device as a software license to be assigned to the management target device, when there is one software license of which the number of possessed licenses is more than or equal to the number of used licenses, among software licenses for which the software product operating in the management target device is included in the product type and the device specification of the management target device meets the device specification condition, in the determining step.

20. The computer-readable, non-transitory medium according to claim 19, wherein the computer determines a software license of which a number of the product types is the least among software licenses of which the number of possessed licenses is more than or equal to a number of licenses used for the management target device as a software license to be assigned to the management target device, when there is a plurality of software licenses of which the number of possessed licenses is more than or equal to the number of used licenses, among software licenses for which the software product operating in the management target device is included in the product type and the device specification of the management target device meets the device specification condition, in the determining step.

* * * * *